3,296,018
PROCESS FOR PREPARING MOISTENABLE HOT MELT ADHESIVE SHEET

Daniel M. Sullivan, Granby, and Leo J. Monaghan, Springfield, Mass., and Leo M. Germain, Shawinigan, Quebec, Canada, assignors, by mesne assignments, to Monsanto Company, a corporation of Delaware
No Drawing. Filed June 23, 1961, Ser. No. 119,030
4 Claims. (Cl. 117—122)

This application is a continuation-in-part of applicants' copending application Serial No. 50,337, filed on August 18, 1960, and now abandoned, for "Moistenable Polyvinyl Alcohol-Acetate Adhesive Films and Method of Preparation."

This invention relates to process for preparing moistenable hot metal adhesive sheet. More particularly, it relates to water moistenable hot metal adhesives comprising polyvinyl alcohol which are especially useful in paper applications.

Water moistenable adhesives are generally applied to paper by two principal methods: (1) an aqueous solution or dispersion of the adhesive composition is spread on the paper by means of a roller coating machine or the like, or (2) the adhesive is dispersed in a non-aqueous solvent such as toluene and is then applied to paper. Each of these methods entails complications in processing and gives products having certain inherent defects.

An undesirable characteristic of the first method is that the water of the system tends to cause the fibers of the paper stock to swell and thus to induce curling therein. In addition, more curling can occur because of the types of adhesives generally applied by the aqueous solution and dispersion methods. This takes place because the coat of adhesive shrinks upon drying and because a similar effect is created whenever the moisture content of the adhesive coat varies in response to changes in ambient atmospheric humidity. Another disadvantage resides in the fact that such adhesives as dextrin and animal glues typically must, after drying, be "broken" by passing the coated stock over knife edges to destroy the continuity of the adhesive film and to allow the paper stock to assume a flat configuration. This treatment, however, not only damages the surface of the paper but is also, for economic reasons, an undesirable processing step.

When a non-aqueous dispersion method is employed, on the other hand, there is no swelling of the fibers since water is absent and therefore there is no attendant curling on drying. Also, as the film of adhesive applied to the paper is not continuous, in contrast to that laid on by the aqueous solution method, no curling of the paper can be induced by shrinkage of the film upon removal of the solvent. However, the disadvantages inherent in the use of expensive, toxic and flammable solvents are immediately apparent.

Furthermore, with the types of adhesive being currently discussed, there is always present the tendency for films to coalesce and become continuous at very high relative humidities. This tendency is of course a function of the nature of the adhesive and will exist whether the adhesive was applied as a continuous film and subsequently broken, or as a non-continuous layer of discrete particles from dispersion. Once formed or reformed, a continuous film will be subject to curling effects with subsequent humidity variations.

Accordingly, it is an object of this invention to develop an adhesive composition that can be applied to paper without recourse either to water or to an organic solvent. Another object is to eliminate the drying process necessitated by the application of a solution or a dispersion of an adhesive to paper. A further object is to produce adhesive films which are continuous and yet do not require breaking. Still another object is to produce adhesive coated paper having excellent resistance to curling under the influence of variations in ambient atmospheric humidity.

This is accomplished, along with other ancillary objects and advantages which will become apparent in the course of the ensuing description and explanation of the invention, by applying to paper as hot melts certain polyvinyl alcohols which may or may not be mixed with polyvinyl acetates and with other auxiliary compounds. The combination of components, where more than one component is employed, serves to bring out the desirable properties of each individual component so that the mixtures will not cause paper fibers to swell, will have the ability to be retained on paper in a continuous film, will possess rheological properties that enable them, once cooled to normal temperatures, to absorb or desorb moisture from the surrounding atmosphere without developing the internal stresses and strains that cause curling and, finally, will develop excellent adhesive properties when moistened with water or other suitable solvent.

The hot metal adhesive of this invention is typified but not limited by the following and the latter formulations provided as examples.

Example 1

Formula: | G.
---|---
Polyvinyl alcohol 40–10 | 110
Polyvinyl acetate V–1.5 | 20
Acetyltriethyl citrate | 5
Ethoxylated urea | 50

The polyvinyl alcohol is a commercial product derived from polyvinyl acetate by means of hydrolysis; it contains 37–42% residual acetate groups on a weight basis and has a viscosity of 1.3 to 2.0 centipoises as a 4% aqueous solution at 20° C. Similarly, the polyvinyl acetate is a product with a viscosity of 1.35–1.65 centipoises for a one molar benzene solution at 20° C. (86 g./l.) and a softening point of 65° C. The other two ingredients are plasticizers for the component resins: the particular citrate used is marketed as Citroflex A–2; ethoxylated derivative of urea is a water soluble product sold as Nopco GS–15.

These materials were placed in a small metal container and heated on a hot plate to 150° C. They were then mixed thoroughly by hand to form a smooth plastic mass of homogeneous appearance.

Samples of this hot melt were applied to strips of adding machine paper by placing the paper on a hot plate and drawing the adhesive across it with a doctor blade. Immediately upon removal from the hot plate, the paper and coating cooled to room temperature and the adhesive was found to be flexible, non-tacky and highly glossy. The paper and coating remained very flat while stored at various and varying temperatures in the range of 60 to 100° F. and humidities of 30 to 98% relative. The adhesive was readily moistenable with water and with mixtures of water and methanol and it became tacky immediately upon wetting therewith. Application of other strips of paper to the wetted surfaces demonstrated that the adhesive developed sufficient strength to tear the paper upon attempted separation of the strips in less than 15 seconds.

While, in theory, any water soluble thermoplastic resin might be imagined competent for such applications, most attempts to reduce this concept to practice have been visited with failure. Most potential candidate resins have been found deficient in at least one essential requirement and are thus inutilizable. Among such incriminating defects are, to name a few, a viscosity that is too high at working temperatures, tackiness of film, deliquescence of film in humid atmosphere, and others.

With respect to use with paper, for example, an eligible resin should, if the invention is to have practical value, be applicable to the paper at a temperature that the paper can withstand, should be applicable mechanically, and once applied and cooled, should remain non-adhesive, i.e. nonblocking, during further processing of the paper article and during storage under normal commercial conditions. These are relatively stringent specifications indeed and the difficulties encountered in meeting them accounts for the universal practice of the industry of applying adhesives to paper in the form of solutions.

Translating these requirements into materials and process parameters first yields the fact that a resin, to be useful, must have a melt viscosity of approximately 100 to 2000 centipoises. A resin of lower viscosity will be too "runny" for proper application to a substrate and, if applied at all, will result in coatings which have a strong tendency to block, i.e. will cause stacks of finished articles, such as gummed envelopes, to stick together on storage. Hardly any comment need be made about resins with melt viscosities greater than 2000 centipoises; fast mechanical application of the adhesive to a substrate would be impracticable, to say the least. The viscosity of the melted resin is, of course, a function of molecular weight, chemical nature and temperature. This melt viscosity is not be confused with the viscosity of a resin in solution at standard concentration which, according to general practice, is used to identify resins. It should be kept in mind, concerning viscosity, that most of the values mentioned in this application are measured in standard solution and are not, unless specified, melt viscosities.

Needed then are resins which when heated to working temperatures will produce a melt having a viscosity within the above mentioned range. The highest temperature acceptable for the application process is 400° C. although most useful resins and resin compositions have been found to melt below 220° C. Where application to paper is contemplated, a temperature of 160° C. should preferably not be exceeded lest the paper be scorched. Some resins, of course, will by themselves give melts of satisfactory viscosity within the acceptable temperature range. Others, on the other hand, will do so only after addition of various plasticizers and stabilizers; without such additives, they would be subject, because of their chemical and physical properties, to decomposition by heat resulting in such phenomena as discoloration, viscosity alteration, etc., the undesirability of which, of course, is relative to the type of use contemplated for the melt so affected. The lower limit of the permissible melting and application temperatures should be approximately 70° C., this being the melting point of the lowest melting resins found acceptable for this invention.

What appears to be a rather interesting relationship between temperature of application and viscosity of melt and tendency to block has emerged from observations made during numerous successful and unsuccessful attempts to solve the problems at hand. It seems that the higher the application temperature which can be used for a resin of acceptable melt viscosity is, the lower will the blocking tendency of the resulting film be. Unfortunately, the relationship remains largely empirical because of the greater potential and actual deterioration accompanying stronger heating, because of the physical and chemical influence of the stabilizers which permit such higher application temperatures, and because of other more poorly understood reasons.

It is surprising indeed that certain polyvinyl alcohol resins, and only these, have been found to possess, either originally or after some modifications which will presently be described, the correct spectrum of properties which allows them to be used in the manner and for the purposes of this invention. They may be characterized by having a residual polyvinyl acetate within the range of 0 to 85% by weight and a viscosity of 1.3 to 75 centipoises as a 4% aqueous solution at 20° C. or, in the case of resins containing more than 65% polyvinyl acetate, as a 4% 1:1 water-isopropyl alcohol solution. Polyvinyl alcohol resins having a viscosity between 1.3 to 7 centipoises and containing from 10 to 80% residual polyvinyl acetate by weight are preferred as one-component adhesives possessing satisfactory water moistenability, although materials of viscosities as high as 15 centipoises may be satisfactory in that respect provided they are plasticized by proper additives so that they show a hot melt viscosity within the 100–2000 centipoise range without having recourse to unacceptably high temperatures.

The application flow characteristics of the already mentioned polyvinyl alcohols are sensibly improved by incorporating in every 100 parts of the resin, up to 60 parts of a polyvinyl acetate resin with a viscosity falling between 1.3 to 60 centipoises. Water moistenability of these compositions, however, is best where the polyvinyl acetate-polyvinyl alcohol ratio does not exceed 0.5. Similarly, the application flow characteristics of the mixture are most favorable when the viscosity of the polyvinyl acetate resin used with the polyvinyl alcohol is restricted to the 1.3 to 10 centipoise range. Note that all polyvinyl acetate viscosities mentioned are those determined for "molar" solutions in benzene, i.e. at concentrations of 86 g./l. Both polyvinyl alcohol and polyvinyl acetate resins are prepared by conventional methods The function of the polyvinyl acetate component in the adhesive mixtures is to lower the melting point of the highly moistenable, low residual acetate polyvinyl alcohols. In this respect, it is evident that nothing will be achieved if a polyvinyl acetate resin having a viscosity higher than those specified earlier is used since in such a case, either the combined resins would melt at an unacceptably high temperature or, if they were to melt at a reasonable temperature, as defined earlier, the viscosity of the melt would be too high for convenient application to substrates. Another effect of polyvinyl acetates on the adhesive mixtures' properties is to make them less water sensitive. This effect is of course greatly beneficial in making the coated article less affectable by atmospheric humidity on storage. By limiting the proportion of the acetate resin as prescribed earlier, insensibility of the adhesive film to atmospheric humidity will be achieved while maintaining acceptable moistenability. In cases where the polyvinyl alcohol selected contains a sufficient amount of internal acetate groups, there is nothing to be gained by incorporating polyvinyl acetate to the adhesive preparation; in such cases, for instance where a 1.3 to 5.0 centipoise polyvinyl alcohol containing 10–30% residual polyvinyl acetate is used, the addition of a plasticizer in amounts of up to 30% by weight of the polyvinyl alcohol will suffice to impart acceptable properties to the adhesive mixture. Furthermore, the higher viscosity resins of this group will, when properly plasticized, show a better thermal stability because of the smaller number of end groups per given weight of resin inherent in longer chain molecules.

A non-volatile plasticizer system may constitute, as just mentioned, an important component of a hot melt moistenable adhesive formulation for certain applications. Such a system largely affects film flexibility, flow, tack and temperature characteristics. There are primary and secondary plasticizers. The former are compatible with the resin to be plasticized over the entire range of the resin-plasticizer ratio. The secondary plasticizers, on the other hand, have limited compatibility with the resin alone and are generally used in combination with a primary plasticizer; they are employed most often to lower cost but they do confer such specific properties as improved control of hot melt viscosity or resistance to plasticizer migration in the film. The plasticizers may be hydrophilic, hydrophobic, or both.

Effective plasticizers for the polyvinyl acetate used in the present formulations include those normally employed with that resin such as, e.g., dibutyl phthalate, dioctyl phthalate, dibutoxyethyl phthalate (Kronisol), mixed N- ethyl-ortho and para-toluenesulfonamide (Santicizer 8), mixed cresyl diphenyl phosphates (Santicizer 140), butyl phthalyl butyl glycolate (Santicizer B–16), polychlorinated polyphenols (the Aroclors), polyoxyethylene aryl ether (Pycal 94), alkyd resin plasticizer (Resoflex 296) and citric acid esters (Citroflex A–2 and A–4). The amount to be used depends on the desired film flexibility and melt viscosity and usually should not exceed 50% of the formulation weight fraction of polyvinyl acetate. Some of the useful plasticizers for the polyvinyl alcohol have already been mentioned and the list includes polyoxyethylene aryl ether (Pycal 94), glycerin, tetrahydrofurfuryl alcohol, dimethylformamide, ethanol formamide, water soluble ethoxylated derivatives of urea (Nopco GS–15) and others. The weight proportion of such plasticizers is also variable and is a function of the flexibility and the viscosity desired. The upper limit may be as high as 50% of the polyvinyl alcohol weight fraction but amounts not greater than 10% are actually preferred.

Stabilizers may be added to the formulations where the adhesive will be subject to prolonged heating and/or very high temperatures. These additives are anti-oxidants and will reduce the thermal degradation of the adhesive. The useful compounds and mixtures of this class include butylated hydroxyanisole (Tenox BHA), butylated hydroxytoluene (Tenox BHT), sodium benzoate, calcium stearate, etc. Stabilizers should constitute from 0.1 to 0.5% of the formulation weight.

Lubricants and anti-sticking agents may be added to the formulations in certain cases to help in preventing tackiness of the adhesive films. AC Polyethylene 8416, a low molecular weight polyethylene, is an example of an effective anti-sticking agent. Such an agent should constitute up to about 5% of the total formulation weight.

Finally, the properties of the hot melt and of the adhesive film made from it may be further modified, if desired, by the inclusion of other compounds such as waxes, fluxing resins, extending resins, pigments, dyes, flavoring and fillers. These additives serve to improve the flow and the spreading properties of the hot melt; they also impart toughness, non-tackiness, color and opacity to the adhesive film; they may also be employed to reduce costs by diluting the active ingredients of the adhesive. The compounds in these classes are too numerous to list and furthermore are well known to the trade.

Several methods may be used to prepare the hot melt formulations for application to paper. One method consists in simply adding the ingredients chosen in the order of increasing melting temperature to a heated pot under agitation. In another method, the ingredients are mixed as solutions and/or dispersions in water and other solvents; the volatiles are then removed, after thorough mixing, and the residue is ready for application.

The ingredients can also be mixed on calendering rolls or similar devices. Or they can be introduced simultaneously into an extruder so designed that sufficient mixing takes place in the melting zone. Some of the components of the formulations such as anti-oxidants, plasticizers and anti-sticking agents, can even be incorporated in some cases, in the polyvinyl acetate that will ultimately be hydrolyzed to yield the polyvinyl alcohol called for by the particular formulation at hand. The important requirements for the manufacture of hot melts, whatever the method used, include a means of thoroughly blending the ingredients, of agitating at temperatures in the range of 150° C. to 400° C., and finally a system for emptying the molten melt from the mixing apparatus.

Hot melts may be applied to paper by roller-coating, knife-coating, spraying, or dipping. Roller-coating is particularly suited to the application of low viscosity melts. It is effective in producing thin coatings that are relatively free of striations and other surface defects. In the dip-coating method, the object is immersed in the molten hot melt. This method is suited to coating irregularly shaped objects. Knife coating is an effective means of applying viscous hot melts and is often used in general adhesive work. Spray coating presents an efficient method of applying hot melt adhesives and coatings; good control of the film distribution is possible and often this technique is used for coating uneven or poorly accessible areas. An interesting variation of the spray coating method consists in spraying the finely divided solid resin through an open flame. The resin melts before it reaches the substrate and fuses into a continuous coat thereon. An advantage of this method lies in that the exposure of the resin to heat is drastically shortened, thus minimizing oxidation and other chemical deterioration. "Flame spraying" is used industrially in the application of polyethylene to paper products.

Now that the components, the methods of formulation and the techniques of application of hot melt adhesives have been described, further examples of the new compositions are presented.

*Example 2*

As an example of the simplest embodiment of this invention, polyvinyl alcohol 40–10, that used in Example 1, was spread on adding machine paper strips on a hot plate with a doctor blade. Although the viscosity of this resin is quite high at temperatures of about 150° C. and its resistance to relative humidities of 90% and higher is poorer than that of the formulation of Example 1, it may be truly described as a good hot melt water moistenable adhesive. The coated strips remained flat at various and varying relative humidities below 90% and at temperatures ranging from 60 to 100° F. The moistenability and "quick tack," i.e. the ability to form a strong bond rapidly after wetting, were excellent, causing the usual paper failure in less than 10 seconds.

*Example 3*

Polyvinyl alcohol 70–10, a resin with a 4% water-isopropyl alcohol solution viscosity of 5 to 8 centipoises at 20° C. and a residual polyvinyl acetate content of 70 to 76%, was applied to paper in the manner of Example 2 and was found superior to the polyvinyl alcohol used in that example in flow characteristics at 150° C. and quick tack. Like the 40–10 polyvinyl alcohol, however, it is prone to some tackiness at relative humidities of 90% or higher.

*Example 4*

A mixture of 60 parts 40–10 polyvinyl alcohol with 40 parts of V–7 polyvinyl acetate, a resin having a softening point of 106° C. and a molar benzene solution viscosity of 6 to 8 centipoises at 20° C., was extruded onto paper to yield an adhesive coating having humidity behavior and cracking properties slightly superior to those of the unplasticized formulation of Example 1 (i.e. containing the polyvinyl resins only).

*Example 5*

The addition of 5 parts of Pycal 94 plasticizer, a polyoxyethylene aryl ether, to the polyvinyl alcohol-polyvinyl acetate formulation of Example 4 also improved the flexibility of the film produced from it without adversely affecting the other properties. Note that in both Examples 4 and 5, the adhesives were applied by extrusion, a process which permits the use of a more viscous melt than that used in preceding examples.

*Example 6*

As an example of a yet different method of application of polyvinyl alcohol as a water moistenable hot melt adhesive, a melted mass of the particular 70–10 resin used in Example 3 was sprayed through a conventional suction type spray gun onto paper strips. The adhesive layer obtained possessed excellent water moistenability; other properties were similar to those of the doctor blade applied film of the earlier example.

Example 7

In this experiment, polyvinyl alcohol 40-10 was ball milled to a particle size of about 200 mesh and it was sprayed, cold, through the flame of a Meeker burner onto paper strips. The resin melted as it passed through the flame and fused into a continuous coating on the paper. This coating showed water moistenability and other properties which were very similar to those of the same resin applied by the doctor blade technique as in Example 2.

The adhesives of this invention are particularly suited for the manufacture of labels, envelope flap seals, wallpaper, poster and billboard displays, book and magazine bindings, postage and trading stamps, and boxes and cartons that are sealed by moistenable adhesives. It hardly needs saying that further uses of the formulations presented herein can be imagined by any one familiar with the art without departing from the spirit of the invention. In fact, the possible uses encompass in theory all the applications of moistenable adhesives employed as such.

What is claimed is:

1. A process for preparing a moistenable adhesive film comprising (a) melting at a temperature range of from 70–400° C. a composition comprising a polyvinyl alcohol resin having a residual polyvinyl acetate content of from 10 to 80% by weight and having a viscosity (measured at 20° C. in a 4% aqueous solution) between 1.3 and 75.0 centipoises and containing from zero to 50% by weight, based on the total weight, of plasticizer, (b) applying the molten resin composition to a surface to be ultimately adhesively secured and (c) cooling to obtain the solid, non-tacky, water moistenable adhesive film.

2. A process as in claim 1 wherein the molten composition comprises essentially 100 parts of a polyvinyl alcohol resin having an acetate content of 15 to 80% by weight and a viscosity of 1.3 to 10 centipoises and from zero to 50 parts of a polyvinyl acetate resin having a viscosity of 1.3 to 10 centipoises (as measured in benzene at 20° C.).

3. A process for preparing a moistenable adhesive sheet comprising: melting a polyvinyl alcohol resin in the temperature range of 165–220° C., said resin having a viscosity (measured in centipoises at 20° C. in a 4% aqueous solution) between 1.3 and 10, said resin containing residual acetate within the range of 5–80% by weight, and applying the molten resin within the said temperature range as a film to a substrate to form said moistenable adhesive sheet.

4. A process for preparing a moistenable adhesive sheet comprising: melting a polyvinyl alcohol resin in the temperature range of 165–220° C., said resin having a viscosity (measured in centipoises at 20° C. in a 4% aqueous solution) between 1.3 and 2.5, said resin containing residual acetate within the range of 5–80% by weight, and applying the molten resin within the said temperature range as a film to a substrate to form said moistenable adhesive sheet.

References Cited by the Examiner

UNITED STATES PATENTS

| | | | |
|---|---|---|---|
| 2,341,398 | 2/1944 | Strother et al. | 260—91.3 |
| 2,424,110 | 7/1947 | Morrison et al. | 117—161 |
| 2,430,372 | 11/1947 | Stamatoff | 260—91.3 |
| 2,587,833 | 3/1952 | Germain | 260—91.3 |
| 2,804,395 | 8/1957 | Boyajian | 117—122 |

FOREIGN PATENTS 824,550  12/1959  Great Britain.

OTHER REFERENCES

Elvanol: Polyvinyl Alcohols, E. I. du Pont de Nemours and Co., Wilmington, Del., 1947 (pp. 4, 5, 6, 20, 26, 31, 36, 39, and 43 relied on).

WILLIAM D. MARTIN, *Primary Examiner.*

RICHARD D. NEVIUS, *Examiner.*

F. W. SHERLING, H. E. COLE, R. HUSACK,
*Assistant Examiners.*